United States Patent
Dyer et al.

[15] 3,666,151
[45] May 30, 1972

[54] APPARATUS FOR AND METHOD OF SEVERING FILM

[72] Inventors: Gerald B. Dyer; Edwin Szpak, both of Kingston, Ontario, Canada

[73] Assignee: Du Pont of Canada, Limited, Montreal, P.Q., Canada

[22] Filed: Aug. 18, 1970

[21] Appl. No.: 64,794

Related U.S. Application Data

[63] Continuation of Ser. No. 826,934, May 22, 1969, abandoned.

[52] U.S. Cl. ..............................225/2, 225/93.5, 225/96, 225/100
[51] Int. Cl. ..........................................B26f 3/02, B26f 3/06
[58] Field of Search......................225/2, 93.5, 96, 100, 96.5, 225/4, 93; 93/17, 18

[56] References Cited

UNITED STATES PATENTS

| | | | |
|---|---|---|---|
| 3,186,628 | 6/1965 | Rohde | 229/66 |
| 2,191,497 | 2/1940 | Potdevin et al. | 225/96 |
| 2,429,944 | 10/1947 | Rayburn et al. | 225/4 |
| 3,039,664 | 6/1962 | Harrison et al. | 225/96 X |
| 3,160,273 | 12/1964 | Reuther et al. | 225/96 X |

*Primary Examiner*—Frank T. Yost
*Attorney*—Hoge T. Sutherland

[57] ABSTRACT

Process of severing film including the steps of subjecting the film to heat and pressure along the desired line of parting to weaken the film and cooling the heated area and effecting severing by pulling the film on either side of the line of parting with a snapping action. Apparatus is provided for performing the above described method of severing.

6 Claims, 4 Drawing Figures

INVENTORS
GERALD B. DYER
EDWIN SZPAK

BY *Hoge J. Sutherland*

ATTORNEY

INVENTORS
GERALD B. DYER
EDWIN SZPAK

BY Hoge O. Sutherland
ATTORNEY

APPARATUS FOR AND METHOD OF SEVERING FILM

This application is a continuation of Ser. No. 826,934 filed May 22, 1969, now abandoned.

This invention relates to the cutting or severing of thermoplastic film and more particularly to an improved method of severing laminated thermoplastic film made from two or more monaxially oriented sheets.

In many film processes, thermoplastic film or tubing must be cut to length before subsequent operations, such as folding. The act of cutting the tube, however, frequently causes blocking or sealing to take place along the cut edge and as a result it is difficult to open the end of the tube length. This problem is particularly acute with laminated oriented tubing made from two or more monaxially oriented films which is coming into general use for industrial shipping bags.

Perforation methods are not suitable because during snapping the tear frequently propagates along the lines of orientation rather than across the sheet.

It is, therefore, an object of the present invention to provide an improved method of severing oriented films.

Another object is to provide a method of heat treating a thermoplastic tube which permits the tubing to be severed or parted along a pattern suitable for complex bag structures.

Accordingly, there is provided a process for severing oriented thermoplastic film or oriented thermoplastic film laminate which comprises subjecting the film to heat and pressure along the desired line of parting to weaken the film, cooling the heated area and effecting severing by pulling the film on either side of the line of parting with a snapping action.

There is also provided a process for producing cut tube lengths from a continuous sheet of oriented thermoplastic film or oriented thermoplastic film laminate which comprises:

subjecting the film to heat and pressure along the desired line of parting to weaken the film, said line of parting having sufficient strength after cooling to permit the continuous sheet to be manipulated and handled through additional process steps but weak enough to permit the various sections of the sheet to be separated from each other by a snapping action;

cooling the heated areas;

folding the sheet of film over on itself to form a tube;

applying an adhesive to form a longitudinal seam along the length of the tube;

separating the tube lengths from each other by pulling the film on either side of the line of parting with a snapping action.

In addition, the present invention provides an apparatus for severing oriented thermoplastic film or oriented thermoplastic film laminate which comprises:

a conveyor means for transporting the film;

a heated bar adapted to be brought into pressure contact with said film along a predetermined line;

means to cool the area of the film heated by said heater bar and means to grip the film on either side of said predetermined line of contact with said heated bar and adapted to produce a snapping action on said film to effect parting.

The present invention also provides an apparatus for producing cut tube lengths from a continuous sheet of oriented thermoplastic film or oriented thermoplastic film laminate which comprises:

a conveyor means for transporting the film;

a heated bar adapted to be brought into pressure contact with said film along a predetermined line;

means to cool the area of the film heated by said heated bar;

a tubing section adapted to form said film into a tube;

an adhesive applicator to form a longitudinal seam along the length of the tube and means to grip the tube on either side of said predetermined line of contact with said heated bar and adapted to produce a snapping action on said tube to effect parting.

These and other objects of the present invention will become evident from the more detailed description set forth below, it being understood that such more detailed description is given by way of illustration and explanation only and not by way of limitation, since various changes therein may be made by those skilled in the art without departing from the scope or spirit of the present invention.

The present invention may be more clearly understood by reference to the drawings in which.

Figure 1:
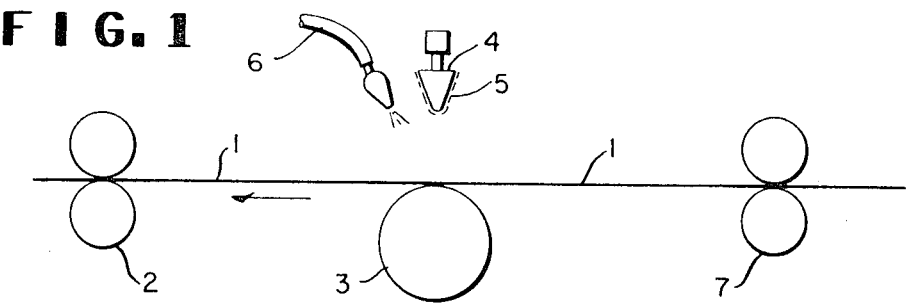
FIG. 1 illustrates a sample apparatus for heat treating film.

Referring to FIG. 1, in operation, a length of film 1 is indexed forward by nip rolls 2 and 7 and stopped at the predetermined length. Rubber coated roller 3 which acts as a bed plate for the heat treating step is driven synchronously with nip rolls 2 and 7 to assist in transporting the film. The heat treating blade 4 is maintained at a controlled temperature and is mounted by means not shown so that it may be raised and lowered. A sheet of polytetrafluoroethylene coated glass fiber cloth 5 is usually provided to prevent sticking of the bar to the film. To effect the heat treating, the bar is pressed against the film at a predetermined pressure and for a predetermined dwell time. The bar is lifted and a cool air blast applied through cooling tube 6. The film is then conveyed forward. Parting is effected by a snapping action at a later stage which is not shown in FIG. 1.

Figure 2:
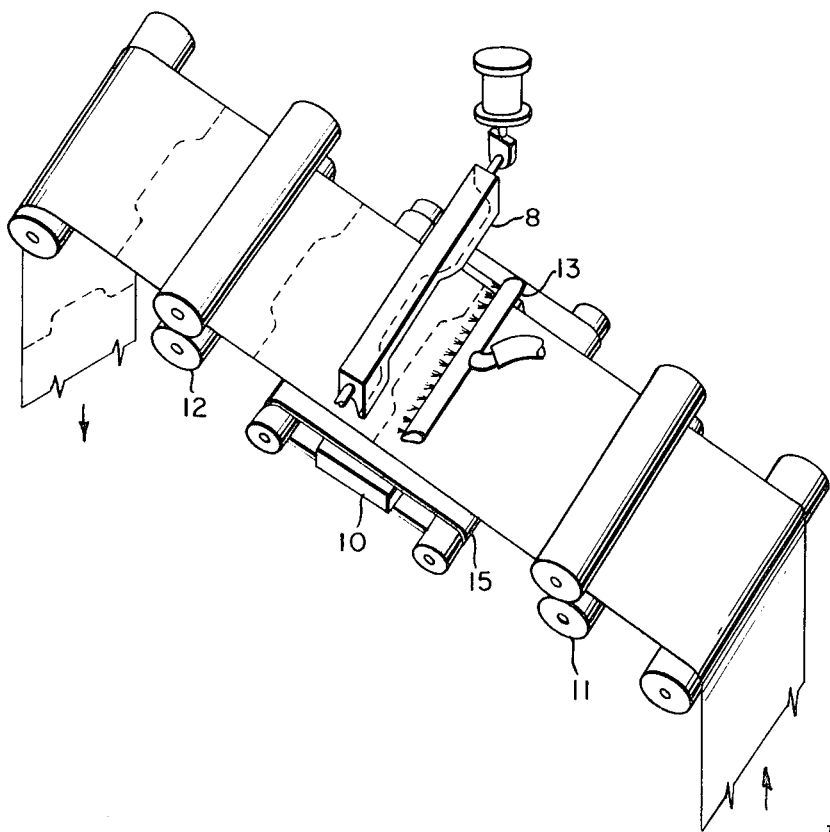
FIG. 2 illustrates a modified arrangement for heat treating that may be used to advantage for a patterned cut.

FIG. 2 is a schematic diagram of an apparatus which may be used to advantage when a patterned cut is desired. Nip rolls 11 and 12 and belt 15 are actuated to bring a length of film forward to the pre-cutting or pre-severing section. A polytetrafluoroethylene coated heat treating bar or blade 8 is lowered by a cam or some other device to come into contact with the stationary film for a predetermined dwell time. Bed plate 10 prevents distortion of the film and belt. Cooling air is provided through distributor 13 to cool the treated area after the blade 8 is lifted. The film is indexed forward by nip-rolls 11 and 12 and the heat severing process repeated on the next section of film.

Figure 3:
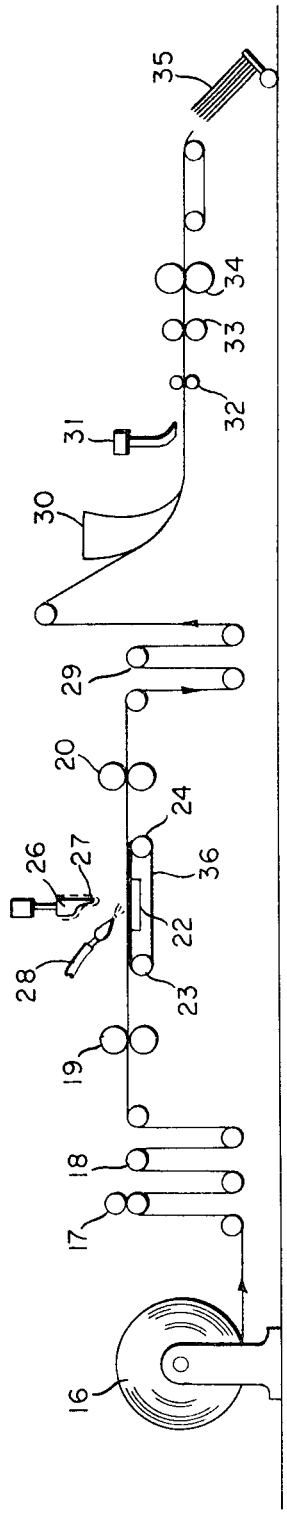
FIG. 3 is a schematic drawing of an apparatus which may be used to produce a tube cut to length.

FIG. 3 is a schematic diagram of an apparatus for producing tubing with a straight or patterned cut.

Film is fed from an unwind stand 16 through a pair of nip rolls 17, a set of "dancing rolls" 18, onto belt 36 which is carried on rolls 23 and 24. Nip rolls 19 and 20 and belt 36 are synchronized to provide an intermittent feed of predetermined length. When the film is stationary, heat treating bar or knife 26, operated by a cam or some other device, descends to contact the film for a predetermined time. Bed plate 22 prevents distortion of the film and a polytetrafluoroethylene coating 27 prevents the blade from sticking to the film. The blade 26 is raised and cold air is blown through tube 28 to cool the film. Nip rolls 19 and 20 and belt 36 are actuated to index a new length of film forward. "Dancing rolls" 29 permit the next steps to be operated continuously. Nip 33 is driven at constant speed and at the same speed as the unwind speed.

The sheet is formed into a tube by tubing section 30 and an adhesive is applied by applicator 31 to form a longitudinal seam running the length of the sheet. This seam is pressed by nip rolls 32.

Hot melt adhesives may be used to advantage with such an arrangement. Suitable hot melt adhesives include polyethylene, copolymers of ethylene, mixtures of polyethylene with elastomers and polyurethane type adhesives. Solvent based adhesives may also be used provided a suitable drying section is added.

The tube continues on through constant speed rolls 33 and hence to nip rolls 34. These nip rolls 34 are provided with an eccentric drive to produce the necessary snapping action to effect severing or parting of the tube. Tubes cut to length are delivered to stack 35.

EXAMPLE I

The following tests were conducted on equipment similar to that shown in FIG. 1. The heat treating bar had a "blade" with a radius of 1/32inch. The rubber coated roll had a durometer hardness of 40 (Shore Type A-2).

A 2.4 mil thick cross laminate of two monaxially oriented films, each with orientation at 45° to the machine direction, was prepared from an ethylene-butene copolymer by stretching approximately 4:1. This laminate was treated with the heat treating blade and then allowed to cool. Good treatment was judged to be that which gave weakening of the film but which allowed the film to be conveyed forward to subsequent processing steps. Temperature versus dwell time conditions which resulted in a satisfactory heat treatment are as follows:

TABLE I

Heat Treatment of Laminate Film (Blade Pressure 30 lb.)

| Temperature °F. | Dwell Time Sec. |
| --- | --- |
| 400 | 1.0 |
| 450 | 0.5 |
| 500 | 0.35 |
| 550 | 0.25 |
| 600 | 0.20 |

After the treatment, parting was readily accomplished by a snapping action.

EXAMPLE II

Figure 4:
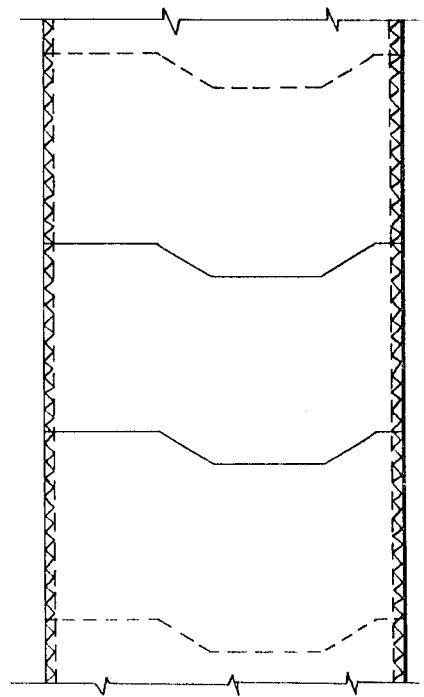
FIG. 4 illustrates a sheet of film heat treated to produce a patterned cut.

A laminate as described in Example I was treated on another apparatus which gave a patterned treatment as shown in FIG. 4. The heat treating blade edge was 1/16inches wide and nip pressure 40 lb. The flat base plate was covered with rubber of 37 durometer hardness (Shore Type A2). At a dwell time of 0.3 seconds, a temperature of 240° to 250° C. was found to give satisfactory treatment. Parting was readily effected by a snapping action.

It is believed that the heat treatment discussed above causes disorientation to take place along the line where the heat is applied. In addition, there may be also some localized thinning of the film. A loss of orientation would cause a great localized reduction in tensile strength and this would act as a tear strip. In any event this treatment is effective in causing local weakening so that a snapping action causes separation.

Thermoplastic film materials which are suitable for use in the present invention include:
polyethylene
polypropylene
polyamide
polyolefin
polyester
polystyrene
polyvinylchloride and
copolymers of ethylene

We claim:

1. A process for severing oriented thermoplastic film or oriented thermoplastic film laminates which comprises subjecting the film to heat and pressure along the desired line of parting to weaken the film, cooling the heated area and effecting severing by pulling the film on either side of the line or parting with a snapping action.

2. The process as claimed in claim 1 in which said thermoplastic material is selected from a list comprising:
polyethylene
polypropylene
polyamide
polyolefin
polyester
polystyrene
polyvinylchloride and
copolymers of ethylene.

3. The process of claim 1 wherein the dimensions of the film along the desired line of parting remain substantially the same after being subjected to the heat and pressure and being cooled.

4. The process for severing a continuous sheet of oriented thermoplastic film or oriented thermoplastic film laminates into separate sections which comprises:
subjecting the film to heat and pressure along the desired line of parting to weaken the film, said line of parting having sufficient strength after cooling to permit the continuous sheet to be manipulated and handled but weak enough to permit the various sections of the sheet to be separated from each other by a snapping action;
cooling the heated areas;
separating the sections of the sheet from one another by pulling the film on either side of the line of parting with a snapping action.

5. The process of claim 4 in which said thermoplastic material is selected from a list comprising:
polyethylene
polypropylene
polyamide
polyolefin
polyester
polystyrene
polyvinylchloride and
copolymers of ethylene.

6. An apparatus for severing oriented thermoplastic film or oriented thermoplastic film laminate which comprises:
a conveyor means for transporting the film;
a heated bar adapted to be brought into pressure contact with said film along a predetermined line;
means to cool the area of the film heated by said heated bar; and
means to grip the film on either side of said predetermined line of contact with said heated bar and adapted to produce a snapping action on said film to effect parting.

* * * * *